United States Patent

Himes et al.

[11] Patent Number: 5,358,047
[45] Date of Patent: Oct. 25, 1994

[54] FRACTURING WITH FOAMED CEMENT

[75] Inventors: Ronald E. Himes; E. Dwyann Dalrymple; Jeffrey A. Dahl; Bruce D. Thomas, all of Duncan, Okla.

[73] Assignee: Halliburton Company, Duncan, Okla.

[21] Appl. No.: 70,630

[22] Filed: Jun. 2, 1993

Related U.S. Application Data

[63] Continuation-in-part of Ser. No. 42,368, Apr. 2, 1993.

[51] Int. Cl.⁵ ............... F21B 33/138; F21B 43/267
[52] U.S. Cl. ................... 166/280; 166/281; 166/283; 166/309
[58] Field of Search ............ 166/276, 280, 281, 283, 166/292, 293, 308, 309; 106/682

[56] References Cited

U.S. PATENT DOCUMENTS

| Re. 27, 271 | 1/1972 | Harnsberger et al. | 166/276 |
|---|---|---|---|
| 2,933,135 | 4/1960 | Johnson . | |
| 3,098,754 | 7/1963 | Dixon . | |
| 3,146,828 | 9/1964 | Mann . | |
| 3,208,522 | 9/1965 | Roebuck et al. . | |
| 3,366,178 | 1/1968 | Malone et al. | 166/280 |
| 3,368,623 | 2/1968 | Carter et al. . | |
| 3,376,146 | 4/1968 | Mitchell . | |
| 3,429,373 | 2/1969 | Harnsberger et al. | 166/276 |
| 3,654,991 | 4/1972 | Harnsberger et al. | 166/281 |
| 3,663,287 | 5/1972 | Mizunuma et al. . | |
| 3,926,257 | 12/1975 | Marrast et al. | 166/293 |
| 4,029,149 | 6/1977 | Perkins | 166/280 |
| 4,470,727 | 9/1984 | Ritter | 405/267 |
| 5,024,276 | 6/1991 | Borchardt | 166/308 |
| 5,058,676 | 10/1991 | Fitzpatrick et al. | 166/278 |
| 5,125,455 | 6/1992 | Harris et al. | 166/292 |
| 5,128,390 | 7/1992 | Murphey et al. | 523/130 |
| 5,133,409 | 7/1992 | Bour et al. | 166/293 |

OTHER PUBLICATIONS

Aldrich, C. H. and Mitchell, B. J., "Strength, Permeabilities, and Porosity of Oil Well Foam Cement," *Journal of Engineering for Industry*, 1975.

Harris, K., "New Lightweight Technology for the Primary Cementing of Oil Field Casing in Cold Environments," Society of Petroleum Engineers, Inc. (SPE), Paper No. 22065, presented at the 1991 SPE Artic Technology Conference.

*Primary Examiner*—George A. Suchfield
*Attorney, Agent, or Firm*—Robert A. Kent; Dennis M. Brown

[57] ABSTRACT

A method of stimulating a subterranean formation using a foamed cement composition. When hardened, the cement composition has a permeability of at least about 0.3 darcies. The inventive formation stimulation method comprises the steps of: (a) injecting the foamed cement composition into the formation at a pressure sufficient to fracture the formation and (b) allowing the cement composition to harden in the formation.

17 Claims, No Drawings

FRACTURING WITH FOAMED CEMENT

This is a continuation-in-part of copending U.S. patent application Ser. No. 08/042,368 filed Apr. 2, 1993.

FIELD OF THE INVENTION

The present invention relates to methods of stimulating subterranean formations. More particularly, but not by way of limitation, the present invention relates to methods of fracturing poorly consolidated or unconsolidated subterranean formations.

BACKGROUND OF THE INVENTION

When producing oil and/or gas from an unconsolidated subterranean formation, some type of particulate control procedure may be required in order to prevent sand grains and/or other formation fines from migrating into the well bore and being produced from the well. The production of such particulate materials can reduce the rate of hydrocarbon production from the well and can cause serious damage to well tubulars and to well surface equipment.

Those skilled in the art have commonly used gravel packs to control particulate migration in producing formations. A gravel pack will typically consist of a mass of sand and/or gravel which is placed around the exterior of a screening device, said screening device being positioned in an open hole or inside a well casing. Examples of typical screening devices include wire-wrapped screens and slotted liners. The screening device will typically have very narrow slots or very small holes formed therein. These holes or slots are large enough to permit the flow of formation fluid into the screening device but are too small to allow the gravel/sand constituents of the gravel pack to pass therethrough. In conjunction with the operation of the holes or slots formed in the screening device, the gravel/sand constituents of the gravel pack operate to trap, and thus prevent the further migration of, particulate materials which would otherwise be produced along with the formation fluid.

Unfortunately, the installation of gravel packs in underground formations can be quite costly. Additionally, special equipment is required for installing gravel packs.

Another technique used to control particulate migration in producing formations involves the use of chemical consolidation treatments. Chemical consolidation treatments can also be quite costly. Further, these treatments require the use of special chemicals and equipment.

Nonpermeable foamed cement compositions have been used heretofore in oil and gas wells for performing various primary cementing operations. Nonpermeable foamed cement compositions are formed by introducing nitrogen, air, or some other gas into a cement slurry. Compared to non-foamed cement compositions, nonpermeable foamed cement compositions typically have low densities and low fluid loss properties.

In performing a primary cementing operation using either a nonpermeable foamed cement composition or some other type of nonpermeable cement slurry composition, the cement composition is pumped down a casing disposed in a well bore such that, when the cement slurry reaches the bottom of the casing, the cement slurry flows up and into the annulus existing between the exterior of the well casing and the earthen wall of the well bore. Upon setting, the nonpermeable cement composition bonds to the casing and to the well bore such that (1) the casing is rigidly supported within the well bore and (2) fluid flow within the cemented portion of the annulus is prevented.

Due to their low densities, nonpermeable foamed cement compositions can be advantageously used in primary cementing operations where it is necessary to minimize hydrostatic pressure effects on weak formations and/or to lift primary cement columns over long annular intervals. Additionally, compared to non-foamed cement compositions, nonpermeable foamed cement compositions typically have high compressibilities. Due to their high compressibilities, nonpermeable foamed cements are resistant to the incursion of pressurized formation gases into and around the cement composition during the primary cementing operation (i.e., before the cement composition has set).

As is well known in the art, a high deviation well, e.g., a horizontally completed well, can be drilled when it is desirable to obtain a well bore which is not strictly vertical. As used herein and in the claims, the term "high deviation well" refers to any well having a well bore which is intentionally drilled such that one or more portions of the well bore are nonvertical. A high deviation well bore can be drilled, for example, when it is desirable to direct the well bore around, to, or through a given formation. The term "horizontally completed well," as used herein, refers to a well wherein the well bore has been drilled to include one or more substantially horizontal sections.

Subterranean formations, although typically very thin, can extend great distances horizontally. Thus, although the bore of a strictly vertical well would extend only a few feet through a typical thin formation, a horizontally completed well can include one or more horizontal well bore sections which extend several hundred or several thousand feet through the formation. By providing much greater contact between the well bore and the formation, the horizontally completed well can provide a higher production rate than would be provided by a strictly vertical well.

In one technique commonly used for completing high deviation wells, a casing is installed in only the substantially vertical initial portion of the well bore. Consequently, formation fluid flows freely into the uncased horizontal portion of the well and is then recovered through the vertical well casing. Unfortunately, the uncased horizontal portion of the well will typically be highly susceptible to cave-ins and sloughing, particularly when the formation through which the horizontal section of the well bore runs is a significantly unconsolidated formation. Additionally, the level of particulate migration occurring in the uncased horizontal portion of a horizontally completed well can be quite high. As discussed above, particulate migration can reduce the hydrocarbon production rate from the well and can cause serious damage to well tubulars and surface equipment.

A second technique commonly used for completing horizontal wells involves placing a length of slotted liner or casing in the horizontal portion of the well. The slotted liner or casing operates to prevent the horizontal portion of the well from collapsing. In order to prevent particulate migration into the slotted liner or casing, a gravel pack can be placed around the exterior of the liner or casing in the same manner as described hereinabove. However, as also discussed above, the installation of a gravel pack can be quite costly, particularly when the gravel pack must extend several hundred or several thousand feet along the horizontal portion of a horizontally completed well.

A third technique commonly used for completing horizontal wells involves placing and cementing a casing in both the vertical and horizontal portions of the well bore. Perforations or sliding sleeve valves must be placed along the horizontal portion of the casing in order to allow the casing to communicate with the producing formation. The formation is typically fractured through these casing perforations or valves. Unfortunately, however, this system typically does not provide adequate protection against the migration of formation particulates into the well casing. Additionally, the perforating operation itself may promote the disconsolidation of the formation. Further, in a highly deviated well, it is typically not desirable to place cement across the productive interval of a naturally fractured formation since the cement will block the horizontal flow of fluid from the natural fractures to the casing perforations or valves.

In view of the above comments, it is evident that a problem of longstanding existing in the completion of wells in subterranean formations having a substantial degree of unconsolidation resides in the need to reduce, if not prevent, the migration of formation particles from the formation to the production tubing and surface equipment without, at the same time, reducing the flow of desired fluids, e.g., oil and/or gas, from the formation. This problem is difficult enough when the borehole is substantially vertical, but it is even more difficult when the borehole is highly deviated or is, in fact, horizontal.

It is understood that producing formations cannot be blocked, such as by primary cementing, because cements ordinarily employed in primary cementing have very low permeability, e.g., less than about 0.001 darcies, which would prevent the flow of desirable fluids from the formation to the production equipment. Accordingly, producing formations penetrated by a borehole are usually not cemented and migration of formation particulates from unconsolidated formations is reduced, or prevented, as above discussed, chemically, by employing a formation consolidation technique, or, mechanically, by employing a gravel packing technique. The above techniques have been used successfully in completing a substantially vertical borehole wherein the portion of the borehole which does not penetrate a producing formation can be cemented to thereby support the casing and isolate and protect producing formations, while unconsolidated producing formations penetrated by the same borehole can be chemically or mechanically treated, as mentioned above, to reduce or prevent fines migration while not blocking the flow desirable fluids.

In contrast with a vertical borehole, a borehole, or a very long portion of one, which lies entirely within a producing formation, such as a horizontal borehole, requires the use of a completion technique which will function to maintain the structural integrity of the borehole itself, i.e., prevent collapse, which will not prevent the flow of desirable fluids from the formation to the production tubulars. Known cements would maintain structural integrity of the borehole but would also prevent flow of desired fluids. Chemical and mechanical treatments, as above described, would not prevent the flow of desired fluids but are very difficult to install in highly deviated boreholes and the ability of such treatments to provide adequate structural integrity has not been established.

Accordingly, the art requires a method which will supply the structural integrity provided by primary cementing; which will control, where required, the movement of formation fines; and which will not prevent the flow of desired fluids from the formation to the production tubulars. This invention provides such a method which features the use of a cement having a permeability low enough to prevent migration of formation particulates but high enough to permit the flow of desired fluids through the hardened cement to production tubulars. The cement develops sufficiently high compressive strength to support and protect formations but is also of sufficiently low density to permit use in weak formations. This cement and the method disclosed is, accordingly, useful in vertical as well as in highly deviated and horizontal boreholes.

As is known in the art, hydraulic fracturing techniques are commonly used to stimulate subterranean formations in order to enhance the production of fluids therefrom. In a conventional hydraulic fracturing procedure, a fracturing fluid is pumped down a well bore and into a fluid-bearing formation. The fracturing fluid is pumped into the formation under a pressure sufficient to enlarge natural fissures in the formation and/or open up new fissures in the formation. Packers can be positioned in a well bore as necessary to direct and confine the fracturing fluid to the portion of the well which is to be fractured. Typical fracturing pressures range from about 1,000 psi to about 15,000 psi depending upon the depth and the nature of the formation being fractured.

Fracturing fluids used in conventional hydraulic fracturing techniques include: fresh water; brine; liquid hydrocarbons (e.g., gasoline, kerosene, diesel oil, crude oil, and the like) which are viscous or have gelling agents incorporated therein; gelled water; and gelled brine. The fracturing fluid will also typically contain a propping agent. Commonly used propping agents include solid particulate materials such as sand, walnut shells, glass beads, metal pellets, plastics, and the like. The propping agent flows into and remains in the fissures which are formed and/or enlarged during the fracturing operation. The propping agent operates to prevent the fissures from closing and thus facilitates the flow of formation fluid through the fissures and into the well bore.

Unconsolidated and poorly consolidated formations typically require some type of stimulative treatment in order to be commercially productive. Such formations typically contain packed sands and fine particulate materials which tend to migrate within the formation as fluid is recovered therefrom. Such migration can substantially reduce the fluid conductivity of the formation.

Conventional hydraulic fracturing techniques have generally not been effective in unconsolidated formations. An unconsolidated formation will typically have little or no structural strength. When the formation is subjected to a conventional hydraulic fracturing procedure, the particulate material contained in the formation tends to move and reconsolidate. Consequently, a substantial quantity of the particulate material becomes mixed with the proppant and thereby reduces the permeability of the proppant bed. Alternatively, the proppant material will sometimes simply become embedded in the formation. Further, due to the typically high initial permeability of an unconsolidated formation, the fluid component of a fluid/proppant mixture will tend to separate from the proppant and leak into the formation. When such separation occurs, a sufficient hydraulic fracture width typically will not be established in the formation to pass and transport the proppant material. As a result, the proppant material will not be placed in created fissures at sufficient distances from the borehole and in sufficient concentrations to yield a substantial increase in flow capacity.

As will also be apparent, many commonly used conventional fracturing fluids contain components which are not suitable for use in potable water-containing formations.

Hydraulic fracturing operations have also been conducted using resin-coated particulate materials (e.g., resin-coated sand) as propping agents. Typical resin materials used for forming such coated proppants include epoxy resins and polyepoxide resins. Once in place in the formation, the resin material is allowed to harden whereby the resin-coated particulate material consolidates to form a hard permeable mass. The resin-coated particulate material will typically be carried into the formation using an aqueous gelled carrier fluid.

Unfortunately, resin-coated proppants are very expensive to use. Fracturing fluids utilizing resin-coated proppants also typically contain materials (e.g., alcohols, polyalcohols, amine hardeners, metallic crosslinkers, and the resins themselves) unsuitable for use in stimulating potable water-containing formations. Additionally, when the fracturing fluid is in place in the formation and the pumping operation is discontinued, the resin-coated particulate material will typically settle within the gelled aqueous carrier fluid to some degree before the resin hardens. As a result of this settling, voids are formed in the resin matrix. Further, the gelling agents (e.g., polysaccharides such as guar and guar derivatives) used in these fracturing fluids can form residues in the resin matrix and in the surrounding formation which reduce fluid conductivity. Finally, fracturing fluids containing resin-coated proppants are not suitable for use in some weak formations which cannot withstand the hydrostatic pressures typically exerted by sand laden slurries.

Aldrich, C. H. and Mitchell, B. J., "Strength, Permeabilities, and Porosity of Oilwell Foam Cement," *Journal of Engineering for Industry*, 1975 discloses foamed cement compositions consisting of API class G cement, a surfactant, water, and air. The authors of this article indicate that such cement compositions can be formed to have either (1) high permeabilities with small interconnected pores and high strength or (2) light weight with disconnected pores or interconnected pores and high strength. The authors speculate that foamed cement compositions might be useful for sand control in oil or gas wells. The authors further speculate that foamed cement compositions may one day be used in oilwell applications by employing placement practices which might parallel those practices used in normal cementations, sand plasticizing, or hydraulic fracturing. However, the authors go on to indicate that, due to insufficient knowledge in areas such as (1) theological properties, (2) placement techniques, (3) mixing techniques, and (4) the effects of additives, such methods and practices are neither known or understood by those skilled in the art. Thus, the article fails to provide sufficient teaching and direction for achieving the speculative results envisioned therein. Rather, the article simply arouses curiosity and generally encourages further investigation and experimentation.

U.S. Pat. No. 3,654,991 discloses a hydraulic fracturing technique which utilizes a fracturing composition composed of: cement, sand, oil, an oil wetting agent, and an aqueous carrier fluid. When the fracturing composition is in place in the formation, an aqueous surface-active agent is pumped into the fracturing composition in order to displace the oil component of the composition and thereby allow the hydration of the remaining cementitious material. The hydration of the cementitious material results in the formation of a fluid permeable cement barrier within the formation fractures.

Serious shortcomings are also encountered, however, in the use of permeable cementitious fracturing compositions of the type employed in the method of U.S. Pat. No. 3,654,991. These compositions are not suitable for use in weak formations which cannot withstand the hydrostatic pressures typically exerted by sand laden slurries. These compositions also typically contain substantial quantities of oil and other materials which are not suitable for use in stimulating potable water-containing formations. Additionally, the oil contained in these compositions can form emulsion blockages within the formation which can reduce formation productivity. Further, when the composition is in place in the formation, there is a substantial likelihood that a significant portion of the composition will not be contacted and activated by the post flush used in the method of U.S. Pat. No. 3,654,991.

Chemical stimulation treatments are also commonly used to enhance fluid recovery from subterranean formations. In a typical chemical stimulation treatment, an acid or solvent is pumped into the formation to dissolve or otherwise remove materials from the formation and thereby open up flow passages therein.

Unfortunately, chemical stimulation treatments of the type just described can actually cause additional disconsolidation to occur within the formation. Such treatments can also cause the release of additional formation fines. Further, most chemical stimulation compositions contain substantial quantities of acids and/or other substances which cannot be used in potable water-containing formations.

Previous attempts to install water wells in the Dolet Hills sand near Mansfield, Louisiana are illustrative of various problems associated with the formation stimulation techniques heretofore used in the art. We have determined that the Dolet Hills sand is a very poorly consolidated potable water aquifer which is characterized by: a horizontal permeability of about 7.74 darcies; a vertical permeability of about 6.45 darcies; a median sand particle size in the range of from 80 to 120 mesh; and a substantial fines content consisting of particles having sizes of 200 mesh and smaller.

Due to its substantial fines content and highly unconsolidated nature, the sustainable fluid conductivity of the Dolet Hills sand is very low. Thus, if a water well is to be installed in the Dolet Hills sand, some type of stimulation procedure must typically be used in order to obtain a suitable sustained rate of fluid production. However, conventional formation stimulation techniques have not been and/or cannot be successfully used in the Dolet Hills sand. Specifically, it is noted that: (a) the very poorly consolidated nature of the Dolet Hills sand and the mobility of the formation sand under flow render conventional hydraulic fracturing procedures ineffective; (b) since the Dolet Hills sand is a potable water aquifer, stimulation techniques (e.g., chemical stimulation and fracturing with resin-coated proppants) cannot be used since these procedures would introduce contaminants into the formation; and (c) resin-coated particulate systems are also generally too expensive for viable commercial use in such applications.

Thus, in view of the above, it is apparent that a need exists for a well stimulation procedure wherein the well stimulation fluid also acts as a formation stabilizer and/or consolidation aid. A need also exists for such a stimulation procedure wherein the stimulation fluid does not contain materials which would contaminate potable water aquifers and other formations. Additionally, a need exists for such a procedure which is economically viable. Further, a need exists for such a procedure which: (a) will operate to form and fill fissures extending substantial distances from the well bore; (b) will not yield undesirable residues, emulsions, and the like which would reduce formation productivity; and (c) will exert relatively low hydrostatic pressures on weak subterranean formations.

SUMMARY OF THE INVENTION

The present invention provides a method of cementing a conduit (e.g., a casing or liner) in a well bore wherein an annulus exists around the exterior of the conduit. The method comprises the step of placing a foamed permeable cement composition in the annulus.

The present invention also provides a method of cementing a conduit (e.g., a casing or liner) in a high deviation well bore wherein an annulus exists around the exterior of the conduit. This method comprises the step of placing a foamed permeable cement composition in a nonvertical portion of the annulus.

The present invention further provides a method of treating a well bore comprising the steps of: (a) filling an uncased portion of the well bore with a foamed permeable cement composition; (b) allowing the permeable cement composition to harden; and (c) drilling a hole through the permeable cement composition along at least a portion of the uncased portion of the well bore.

These inventive methods provide effective and less costly means of: (1) supporting casings in unconsolidated formations and/or nonvertical well bores; (2) preventing the migration of particulate materials into well casings from unconsolidated formations and/or from nonvertical well bores; and (3) preventing well bore collapse in unconsolidated formations and/or nonvertical well bores. Additionally, these inventive methods facilitate fluid production from unconsolidated formations and/or nonvertical well bores. Further, these inventive methods eliminate the need for costly gravel packs and chemical consolidation treatments and, in some cases, eliminate the need for performing perforating operations.

The present invention also provides a method of stimulating a subterranean formation. The inventive stimulation method utilizes a foamed cement slurry composition. When hardened, the cement composition has a permeability of at least about 0.3 darcies. The inventive stimulation method comprises the steps of: (a) injecting the foamed cement composition into the subterranean formation at a pressure sufficient to fracture the formation and (b) allowing the cement composition to harden in the formation.

The inventive formation stimulation method substantially increases formation production rates by providing continuous, permeable, cement projections which extend substantial distances into the formation. These permeable projections provide increased contact with the formation and facilitate the flow of formation fluid to the well bore. Additionally, these cement projections are substantially rigid and are resistant to changes in form which could otherwise be caused by the movement of the formation under fluid flow.

The inventive formation stimulation method also alleviates the above-discussed problems associated with the stimulation techniques heretofore used in the art. The foamed cement composition used in the inventive method operates as both a stimulation fluid and a formation stabilizer and/or consolidation aid. Additionally, the foamed cement Composition does not contain materials which will contaminate potable water aquifers and other formations. The inventive stimulation method is also considerably more cost effective then previous methods utilizing resin-coated particulate materials. Further, the foamed cement slurry composition used in the inventive method has a low density and therefore will exert a relatively low hydrostatic pressure on subterranean formations. The foamed cement slurry composition also has very low fluid loss properties. Therefore, the slurry fluid will not substantially separate from the slurry and flow into and damage the formation.

Further objects, features, and advantages of the present invention will be apparent to those skilled in the art upon reading the following description of the preferred embodiments.

DESCRIPTION OF THE PREFERRED EMBODIMENTS

Each of the inventive methods described herein preferably utilizes a foamed cement composition which, when set, is sufficiently permeable to allow oil, gas, and/or other formation fluids to flow therethrough but which will not allow the migration of substantial quantities of formation particulates. A cement composition having a permeability of about 0.3 darcies will typically be as conductive to flow as most producing subterranean formations. Consequently, when set, the cement composition used in the inventive methods will preferably have a permeability of at least about 0.3 darcies. More preferably, the cement composition will have a permeability in the range of from about 0.3 to about 50 darcies. Foamed cement compositions having permeabilities in the range of from about 0.3 to about 30 darcies are particularly well-suited for use in the present invention. Cement compositions having permeabilities in the range of from about 0.3 to about 30 darcies will be conductive to formation fluid flow but will prevent the migration of formation particulates.

The foamed cement composition used in the methods of this invention is comprised of hydraulic cement, an amount of water sufficient to form a pumpable slurry, and a gas such as nitrogen or air. The foamed cement composition will preferably contain in the range of from about 38% to about 90% water by weight of hydraulic cement.

As defined in Hawley's *Condensed Chemical Dictionary*, 11th Edition, Van Nostrand, Reinhold Company, 1987, a hydraulic cement is any mixture of fine-grained lime, alumina, and silica that will set to a hard product by admixture of water which combines chemically with the cement ingredients to form a hydrate. Examples of hydraulic cements preferred for use in the present invention include Portland cement and calcium aluminate cement. Class H and Class C Portland cement are particularly well-suited for use in the present invention.

The gas component of the foamed cement composition will preferably be added in an amount sufficient to provide a foamed cement composition density in the range of from about 4.5 lb/gal to about 10 lb/gal. Stable foamed cement compositions having densities of less than 4.5 lb/gal are generally difficult to form. Foamed cement compositions having densities substantially above 10 lb/gal, on the other hand, are generally nonpermeable when hardened.

The gas component preferred for use in the foamed cement composition is air. Air provides a larger bubble structure than does nitrogen. Thus, all things being equal, foamed cement compositions prepared using air are more permeable than foamed cement compositions prepared using nitrogen.

As indicated above, the gas component of the foamed cement composition will most preferably be added to the foamed cement composition in an amount sufficient to provide a hardened composition permeability in the range of from about 0.3 to about 30 darcies. Permeabilities within this range will typically be achieved when the gas component of the foamed cement composition is present in an amount in the range of from about 30% to about 70% by volume based on the total volume of the foamed cement composition.

The foamed cement composition used in the inventive method will also preferably include at least one foaming agent. The foaming agent will preferably operate to facilitate the foam forming process and to stabilize the foamed cement composition. Generally any foaming agent used for producing foamed cement compositions can be used in the inventive method. The foaming agent presently preferred for use in the permeable foamed cement composition is a commercially available material composed of ammonium ether sulfate, ethylene glycol monobutyl ether, and water. When used, the foaming agent will preferably be present in the foamed cement composition in an amount in the range of from about 0.5% to about 5% by volume based on the total volume of the hydraulic cement and the water components of the foamed cement composition.

The foamed cement composition can further include at least one foam stabilizer. The foam stabilizer presently preferred for use in the permeable foamed cement composition is 1-propanaminium, 3-amino-N-(carboxymethyl)-N-N-dimethyl-N-coco alkyl. The foam stabilizer is preferably present in the foamed cement composition in an amount in the range of from about 0.25% to about 3% by volume based on the total volume of the hydraulic cement and the water components of the foamed cement composition.

The foamed cement composition can also include generally any additive which is used in the art for the production of foamed cement compositions. Examples of such additives include: fluid loss additives, lost circulation additives, expansion additives, hardening accelerators, hardening retarders, weighting agents, and strength enhancing fibers (e.g., glass fiber, carbon fiber, cotton fiber, polyester fiber, and the like).

The foamed cement composition can generally be prepared using any technique which is commonly used in the art for preparing foamed cement compositions. One particularly desirable method of forming the foamed cement composition includes the steps of: (1) dry mixing the cement component of the composition with any dry additives which are to be included in the composition; (2) mixing the resulting dry blend with the water and any liquid additive components of the foamed cement composition to form a slurry; (3) pumping the slurry into the well bore of the well being treated; and then (4) injecting the gas component of the foamed cement composition into the composition as it flows into the well bore. As the resulting composition flows into the well bore and down the well tubing, a stable foam is formed. If desired, any liquid additives used in the foamed cement composition could alternatively be injected into the cement composition as it flows into the well bore.

In one particularly preferred embodiment of the inventive method, the foamed cement slurry composition is pumped down a tubing string positioned within a slotted or perforated well casing, liner, or similar conduit which extends into the well. The annulus between the tubing string and the slotted or perforated conduit is temporarily blocked using packers positioned above and below the slotted or perforated portion of the conduit. With these packers in place, the cement composition flowing out of the end of the tubing string is forced to flow upward into the annulus existing on the outside of the conduit. When the foamed cement composition is in place across the slotted or perforated section of the conduit, the pumping operation is discontinued and the cement composition is allowed to harden. The hardened cement composition forms a hard, permeable, cement sheath around the exterior of the conduit.

This embodiment of the inventive method is particularly useful for completing portions of a well which are nonvertical and/or extend through unconsolidated producing formations.

The permeable cement sheath formed around the exterior of the well casing or liner in accordance with this embodiment of the present invention can be used to direct well stimulation treatments to targeted formation intervals by injecting diverting agents or other materials into those portions of the cement sheath which extend through nontargeted portions of the formation. Alternatively, these materials can be used to seal or isolate sections of the wellbore to prevent the production of unwanted fluids, such as brine water and the like. These diverting agents or other materials operate to substantially reduce the permeability of the portions of the cement sheath into which they are injected so that the well stimulation fluids are directed to the targeted portions of the formation or production of undesired formation fluid is substantially reduced.

In another particularly preferred embodiment of the inventive method, the foamed cement composition is pumped into an uncased portion of a well bore. After the uncased portion of the well bore is filled with the cement slurry composition, the composition is allowed to harden. Subsequently, a hole is drilled through the hardened cement material along at least a portion of the length of the uncased well bore section. The resulting permeable cement structure allows the free flow of oil, gas, and/or other formation fluid into the well bore but prevents the substantial migration of formation particulates into the well bore. This second embodiment of the inventive method is especially well-suited for treating uncased well bore sections which extend through unconsolidated producing formations.

In yet another particularly preferred embodiment of the inventive method, a foamed cement slurry of the type described hereinabove is pumped down a tubing string and is used to hydraulically fracture a fluid-bearing subterranean formation. The foamed composition can be directed and confined to the formation in question using packers and other equipment commonly employed in conventional hydraulic fracturing techniques. The composition is delivered to the formation at a pressure which meets or exceeds the fracture initiation pressure of the formation. Consequently, the composition enlarges, extends, and flows into natural fissures existing in the formation. Additionally, the composition forms new fissures in the formation and extends and flows into these fissures.

After initiating the fracturing process, the foamed cement composition is pumped into the formation for a period and under a pressure sufficient to extend the formation fissures a desired distance into the formation. When the fracturing process is completed, the foamed cement composition is allowed to set in the formation fractures. A sufficient amount of pressure is maintained on the foamed cement composition during the setting period to prevent the composition from flowing out of the formation fractures.

When the cement composition has hardened in the formation fractures, the composition is competent to prevent the reconsolidation of sand grains and fines. Such reconsolidation would operate to close fractures formed using a conventional fracturing technique. Thus, the hardened cement composition provides permeable flow channels within the formation which facilitate the flow of formation fluid into the well bore.

When the inventive fracturing method is being used to stimulate a consolidated or semi-consolidated formation, an amount of a large sized proppant material is preferably added to the foamed cement slurry composition. As used herein, the terms "consolidated" and "semi-consolidated" refer to formations which have some degree of structural stability. When subjected to a fracturing procedure, such formations can exert very high fracture closure stresses. The proppant material aids in holding the formation fractures propped open while the cement composition hardens.

The large proppant material can generally be any proppant material used in the art. The large proppant material is preferably sand. The large proppant material preferably has a particle size in the range of from about 2 to about 10 U.S. mesh.

In contrast to a conventional hydraulic fracturing procedure, the proppant material used in the inventive method is not used in an amount sufficient to fill formation fractures with said proppant material and thereby form permeable proppant flow paths within the formation. Rather, the large proppant material used in the inventive method is added to the foamed cement slurry composition only in an amount sufficient to aid in keeping the formation fractures propped open during the cement setting process. Consequently, the amount of large proppant material added to the foamed cement slurry composition will typically be substantially less than the amount of proppant material used in a conventional fracturing fluid.

The large proppant material will preferably be added to the foamed cement slurry composition in an amount not exceeding about one pound per gallon of the foamed cement slurry. The large proppant material is most preferably added to the foamed cement slurry composition in an amount in the range of from about 0.1 to about 1 pound per gallon of the foamed cement slurry, whereby said proppant material is present in said cement composition in an amount in the range of from about 1.4 to about 45.9 parts by weight per 100 parts by weight of said hydraulic cement.

When used in the inventive method, the large proppant material can be mixed with the foamed cement slurry by, for example, injecting the proppant into the foamed cement slurry as the slurry is being pumped into the well bore. As will be understood by those skilled in the art, such injection can be accomplished using a common sand injector or similar equipment.

In each of the embodiments of the inventive method discussed above, acid treatments (e.g., hydrochloric and/or hydrofluoric acid solution treatments) or other matrix treatments can be used to increase the permeability of the hardened cement material. Such treatments will typically operate to dissolve one or more components of the hardened cement composition and thereby increase the pore size and permeability of the hardened composition. Consequently, when used in conjunction with these treatments, it is preferred that the cement composition include at least one additive which will readily dissolve when treated. The preferred additive used in the cement composition for accomplishing this purpose is calcium carbonate. Calcium carbonate is essentially an inert additive when included in the foamed cement composition. However, the calcium carbonate additive will readily dissolve when the hardened cement composition is treated with acid.

The following examples are provided in order to illustrate the present invention.

Example I 650 grams of Class C Portland cement, 364 grams of water, 4.3 milliliters of the above-described preferred foaming agent, and 2.2 milliliters of foaming surfactant (1-propanaminium, 3-amino-N-(carboxymethyl)-N-N-dimethyl-N-Coco alkyl) were mixed together. The mixture was then added to a previously tared Waring blender jar to bring the total weight of the contents of the jar to 710 grams. Next, the mixture contained in the jar was foamed with air by capping the jar and blending at maximum speed for 10 seconds. The resulting foamed cement slurry composition had a density of 5 lb/gal. Upon hardening, the foamed cement composition had a permeability of 27.2 darcies. Additionally, the hardened cement composition exhibited compressive strengths of 50 psi after 24 hours, 120 psi after 48 hours, 130 psi after 72 hours, and 165 psi after 96 hours. Thus, the hardened cement composition would be conductive to formation fluid flow but would operate to prevent the migration of formation particulates. Additionally, the hardened cement composition possesses sufficient strength to prevent well bore collapse and/or to rigidly support a well casing in a well bore.

Example II

A Dolet Hills sand core sample was cleaned by removing any visible foreign material therefrom. Next, the sample was sequentially washed with naphtha, acetone, an aqueous 2% potassium chloride solution, and acetone. The sample was then dried for 30 minutes at 150° F.

A portion of the Dolet Hills sand sample was placed in a one-inch diameter Teflon-sleeved consolidation chamber. Specifically, the Dolet Hills sand was placed on a 100-mesh screen positioned in the bottom of the chamber. The amount of Dolet Hills sand placed in the chamber was sufficient to provide a sand depth of two inches.

Next, a foamed cement composition was prepared in the same manner as described in Example I. An amount of the foamed cement composition sufficient to provide a cement composition depth of three inches was poured on top of the 2-inch layer of Dolet Hills sand. The chamber was then allowed to stand for 48 hours at room temperature. Next, fresh water was pumped through the Dolet Hills sand and into the hardened permeable cement composition at a pressure of 55 psi. Fresh water was pumped through the sand and cement until a stable flow rate through the cement composition was obtained. The permeability of the cement composition was then calculated to be 1.2 darcies.

This test was repeated using Oklahoma No. 1 sand. The permeability of the cement composition when placed on a 2-inch layer of Oklahoma No. 1 sand was calculated to be 3.6 darcies.

Two 2-inch cubes of the foamed cement composition were prepared and allowed to harden for four days. Using these hardened cubes, the average density of the hardened cement composition was determined to be 4.9 pounds per gallon and the average compressive strength of the hardened cement composition (after four days) was determined to be 165 psi.

Example III

A second Dolet Hills sand test was conducted using a stainless steel sleeve having an internal diameter of 5 cm. A 100-mesh steel screen was positioned in the bottom of the stainless steel sleeve. Dolet Hills sand was placed on top of the 100-mesh screen to a depth of 10 cm. A foamed cement composition prepared using the same procedures described in Example I was then poured on top of the Dolet Hills sand layer to provide a combined sand and cement depth of 23 cm. Next, the stainless steel sleeve was capped and the cement composition was allowed to cure at room temperature for 48 hours.

After the curing period, fresh tapwater was pumped under constant head pressure through the Dolet Hills sand and into the hardened cement composition. The cement composition exhibited a permeability of 27.2 darcies.

Example IV

Another flow test was conducted wherein nitrogen gas was used as the cement foaming agent. The foamed cement composition was prepared using the same procedure as described in Example I with the exception that (1) prior to blending, a vacuum line was connected to the lid of the capped blender jar, (2) a vacuum was then established in the blender jar for a period of 30 minutes, (3) nitrogen gas was then slowly introduced into the blender jar until atmospheric pressure was reached, and (4) the contents of the blender jar were then blended at maximum speed for 10 seconds.

The resulting foamed cement slurry had a density of 6 pounds per gallon. Consequently, the entire blending procedure was repeated using a reduced volume of slurry and increased volume of nitrogen gas such that the density of the foamed composition formed therefrom was 5.1 pounds per gallon.

A flow test identical to the test described in Example III was then conducted using the 5.1 pound per gallon nitrogen-foamed cement composition. After hardening, the cement composition was determined to have a permeability of 2.0 darcies. The low permeability of the nitrogen- foamed composition compared to the air-foamed composition is believed to have resulted from the formation of a smaller bubble structure in the nitrogen composition.

Example V

Using atomic absorption, a toxic metal analysis was performed on the foamed cement composition used in Example III. The results of this test are provided in Table I. Only chromium was present in the cement composition in any significant quantity. An analysis of the first 200 milliliters of effluent produced in the flow test of Example III indicated that the effluent contained no chromium. Additionally, a TOC analysis of the effluent indicated that the effluent contained no detectible organic materials. Thus, no potentially toxic components of the cement were leached into the water effluent.

TABLE I

| Trace Metal Analysis of Air-Foamed Class C Cement Composition | |
|---|---|
| Metal | Amount (PPM) |
| As | <0.4 |
| Ba | <10.0 |
| Cd | 0.4 |
| Cr | 72.0 |
| Pb | 1.2 |
| Hg | <0.05 |
| Se | 3.3 |
| Ag | 1.1 |

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of stimulating a subterranean formation comprising the steps of:
    (a) injecting a foamed cement slurry composition into said subterranean formation at a pressure sufficient to fracture said subterranean formation, wherein said foamed cement slurry composition comprises hydraulic cement, water, a gas, and a proppant material, wherein, when hardened, said cement composition has a permeability of at least about 0.3 darcies and wherein said proppant material is present in said cement composition in an amount in the range of from about 1.4 to about 45.9 parts by weight per 100 parts by weight of said hydraulic cement and
    (b) allowing said cement composition to harden in said formation.

2. The method of claim 1 wherein said water is present in said foamed cement composition in an amount in the range of from about 38% to about 90% by weight based on the weight of said hydraulic cement and said gas is present in said foamed cement composition in an amount in the range of from about 30% to about 70% by volume based on the total volume of said foamed cement composition.

3. The method of claim 2 wherein said foamed cement composition further comprises a foaming agent.

4. The method of claim 2 wherein said foamed cement composition further comprises a foam stabilizer.

5. The method of claim 2 wherein said foamed cement composition used in step (a) has a density in the range of from about 4.5 to about 10 lb/gal.

6. The method of claim 1 wherein, after said cement composition hardens, said cement composition has a permeability in the range of from about 0.3 to about 30 darcies.

7. The method of claim 1 wherein said proppant material consists essentially of particles sized in the range of from about 2 to about 10 U.S. mesh.

8. The method of claim 7 wherein said proppant material is sand.

9. A method of stimulating a semi-consolidated subterranean formation comprising the steps of:
   (a) adding a proppant material to a foamed cement slurry composition, said foamed cement slurry composition having a permeability, when hardened, of at least about 0.3 darcies;
   (b) injecting said foamed cement slurry composition having said proppant material added thereto into said subterranean formation at a pressure sufficient to fracture said subterranean formation; and
   (c) allowing said foamed cement slurry composition to harden in said formation,
   wherein said foamed cement slurry composition comprises hydraulic cement, water, and a gas, and said proppant material has a particle size in the range of from about 2 to about 10 U.S. mesh.

10. The method of claim 9 wherein said water is present in said foamed cement slurry composition in an amount in the range of from about 38% to about 90% by weight based on the weight of said hydraulic cement and said gas is present in said foamed cement slurry composition in an amount in the range of from about 30% to about 70% by volume based on the total volume of said foamed cement slurry composition.

11. The method of claim 9 wherein said proppant material is added to said foamed cement slurry composition in an amount not exceeding about one pound of said proppant material per gallon of said foamed cement slurry composition.

12. The method of claim 9 wherein said proppant material is added to said foamed cement slurry composition in an amount in the range of from about 0.1 to about 1 pound of said proppant material per gallon of said foamed cement slurry composition.

13. The method of claim 9 wherein said foamed cement slurry composition further comprises a foaming agent.

14. The method of claim 9 wherein said foamed cement slurry composition further comprises a foam stabilizer.

15. The method of claim 9 wherein said foamed cement slurry composition has a density in the range of from about 4.5 to about 10 lb./gal.

16. The method of claim 9 wherein, after said cement composition hardens, said cement composition has a permeability in the range of from about 0.3 to about 30 darcies.

17. The method of claim 9 wherein said proppant material is sand.

* * * * *